United States Patent [19]

Rodgers

[11] Patent Number: 5,048,298
[45] Date of Patent: Sep. 17, 1991

[54] LOW COST FUEL SYSTEM FOR A GAS TURBINE ENGINE

[75] Inventor: Colin Rodgers, San Diego, Calif.

[73] Assignee: Sundstrand Corporation, Rockford, Ill.

[21] Appl. No.: 377,564

[22] Filed: Jul. 10, 1989

[51] Int. Cl.$^5$ .............................................. F02C 7/22
[52] U.S. Cl. ........................................ 60/726; 60/734
[58] Field of Search ............ 60/39.02, 39.06, 39.36, 60/726, 728, 734, 740

[56] References Cited

U.S. PATENT DOCUMENTS

| | | | |
|---|---|---|---|
| 1,998,784 | 4/1935 | Mock | 60/728 |
| 2,256,198 | 9/1941 | Hahn | 60/39.36 |
| 2,602,289 | 7/1952 | Anxionnaz et al. | 60/39.02 |
| 2,671,314 | 3/1954 | Lichty | 60/39.02 |
| 3,287,905 | 11/1966 | Bayard | 60/39.36 |
| 3,309,866 | 3/1967 | Kydd . | |
| 3,313,103 | 4/1967 | Johnson . | |
| 3,740,948 | 6/1973 | Kellett | 60/726 |
| 3,940,923 | 3/1976 | Pfefferle . | |

Primary Examiner—Louis J. Casaregola
Attorney, Agent, or Firm—Wood, Phillips, Mason, Recktenwald & VanSanten

[57] ABSTRACT

The high cost of the fuel injection system in a gas turbine engine can be reduced by utilizing a low cost jet or nozzle (70) to spray fuel into the inlet (24) of a compressor (18). The resulting air-fuel mixture flows as a semi-discrete sector to a combustor (58) to be swirled therein and combusted to drive a turbine wheel (50).

7 Claims, 1 Drawing Sheet 5,048,298

LOW COST FUEL SYSTEM FOR A GAS TURBINE ENGINE

FIELD OF THE INVENTION

This invention relates to gas turbine engines, and more specifically, to fuel systems for the same.

BACKGROUND OF THE INVENTION

The fuel systems of air breathing engines can generally be divided into two distinct categories. In one category, the fuel is sprayed out of one or more jets into an area generally at a pressure somewhat less than ambient. A typical example of an engine utilizing this approach is a carbureted internal combustion engine.

In a second category, high pressure fuel injectors may be utilized, the high pressure being useful in atomizing the fuel as it emanates from a nozzle. Typical examples of this approach include direct injection diesel engines and virtually all gas turbine engines.

In the case of the latter, gas turbines use high pressure injection into the combustion chamber primary combustion zone in order to obtain the desired or required fuel ratio that is necessary to sustain stable, efficient combustion.

In the usual case, gas turbine engines utilize a source of pressurized fuel along with a plurality of discrete injectors to spray and atomize the fuel into the combustion chamber at high pressure. Fuel pumps are required to operate over a wide range of fuel flows and with varying suction conditions. Frequently, they may require boosting or multiple stages.

Not infrequently, the use of such high pressure systems will represent a fairly high percentage of the total cost of an engine. For example, it would not be surprising to those skilled in the art that the cost of fuel pumps, injectors, manifolds and associated metering controls could constitute as much as 25% of the total cost of the gas turbine engine.

The present invention is directed to overcoming one or more of the above problems.

SUMMARY OF THE INVENTION

It is the principal object of the invention to provide a new and improved gas turbine engine. More specifically, it is an object of the invention to provide such an engine that has a relatively low cost fuel system.

An exemplary embodiment of the invention achieves the foregoing object in a gas turbine engine including a rotor journaled for rotation about an axis. The rotor includes a rotary compressor and a turbine wheel. A nozzle is interposed between an annular combustor and a turbine wheel for directing gases and combustion from the combustor against the turbine wheel and a plenum surrounds the combustor and is connected to the compressor outlet. A low pressure fuel jet is disposed at the compressor inlet and is directed to spray fuel into the inlet at a predetermined location that is substantially less than peripherally around the inlet.

As a consequence of this construction, a localized stream of air fuel mixture passes through the plenum into the combustor and may be combusted therein. The air fuel mixture is generated utilizing a low pressure fuel jet and thus, may be inexpensive to construct. The air fuel mixture remains substantially discrete such that cooling air without any fuel will exist in the remaining of the plenum.

In a preferred embodiment of the invention, the compressor and turbine wheel are on a single rotor and thus are coaxial. Preferably, the inlet is centered on the rotational axis and in a highly preferred embodiment, the jet injects radially inward from a location adjacent to periphery of the rotary compressor.

In a highly preferred embodiment, means are provided to extend between the plenum and the combustor and define a channel which conveys the air fuel mixture to the interior of the combustor. Such means preferably are in the form of walls that act as ducting.

Preferably, the ducting is a spiraled configuration.

Other objects and advantages will become apparent from the following specifications taken in connection with the accompanying drawings.

DESCRIPTION OF THE PREFERRED EMBODIMENT

Figure 1:
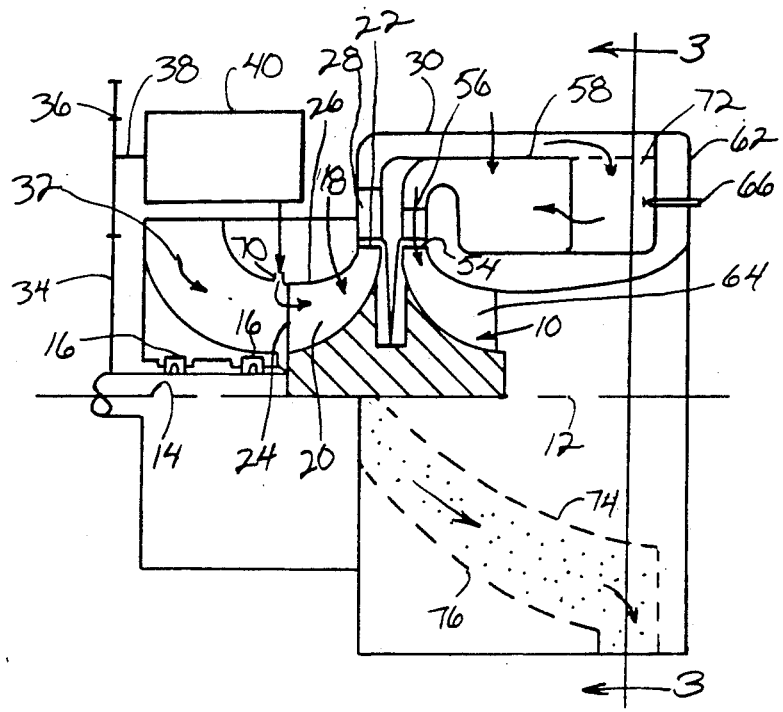
FIG. 1 is a side elevation of a gas turbine engine made according to the invention with parts broken away and shown in section for clarity.

An exemplary embodiment of the invention is illustrated in the drawings and with reference to FIG. 1 is a scene to include a rotor, generally designated 10, journaled for rotation about an axis 12. The rotor 10 includes a shaft 14 received in bearings 16 to provide the aforementioned journaling.

The rotor 10 includes a rotary compressor, generally designated 18, which includes blades 20 of conventional construction that define a radial outflow compressor, thus, the radially outer ends 22 of the blades 20 serve as an outlet for the compressor while radially inner ends 24 serve as an inlet to the compressor. As is well known, a shroud 26 closes off the periphery of the blades.

A conventional diffuser 28 is positioned about the ends 22 for the usual purposes and discharges into a plenum defined by housing 30 which surrounds much of the engine and extends axially.

About the shaft 24 is a somewhat bell-shaped, annular inlet passage 32 that extends to the inlet ends 24 of the blades 20 of the rotary compressor 18.

The shaft 14 may mount a gear 34 which in turn is meshed with a gear 36 on the driven shaft 38 of a fuel pump 40.

Returning to the rotor 10, oppositely of the rotary compressor 18, the same includes a turbine wheel, generally designated 50. The turbine wheel 50 includes a series of blades 52 having radially outer ends 54 surrounded by an annular nozzle 56 which acts to direct gases of combustion from an annular combustor 58 against the blades 52 to drive the turbine wheel 50. The turbine wheel is, of course, coupled to the rotary compressor 18, both being part of the same rotor 10 and thus drives a compressor 18.

The nozzle 56 is connected to the outlet end 60 of the combustor 58. It will also be observed at the plenum, in addition including the radially outer housing wall 30, includes a generally radially extending wall 62 along with a radially inwardly located annular wall 64 so as to substantially entirely surround the combustor 58 in space relation thereto. Consequently, the combustor may be cooled by gas flowing in the plenum about the same.

An igniter 66 may extend through the wall 62 and into the interior of the combustor 58 to ignite an air fuel mixture therein.

To provide an air fuel mixture for combustion within the combustor 58, advantages taken of a discovery and material such as vaporized fuel, will take a discrete path through the compressor 18, the diffuser 28 and the plenum in spite of varying speeds of the rotor 10. That is to say, the ratio of the axial velocity of gases entering the machine to the rotor tip speed as represented by, for example, the speed of the ends 22 of the compressor 18 is substantially constant for all operational speeds above approximately 20% of rated speed.

Thus, the invention contemplates the provision of possibly as few as a single fuel jet or nozzle 70 which may be configured similarly to the high speed jet in an automotive carburetor. The jet or nozzle 70 is located at about the periphery of the rotary compressor 18 as can be seen in FIG. 1 and slightly upstream of the inlet ends of 24 of the blades 20 thereof. As a consequence, fuel provided to the jet 70 by the pump 40 will enter the inlet to the compressor 18 at an area of less than atmospheric pressure, that is, the so-called compressor inlet "eye" region. Because the fuel is sprayed into this subatmospheric region, excellent atomization is obtained even though a relatively low cost nozzle or jet 70 is employed.

Figure 2:
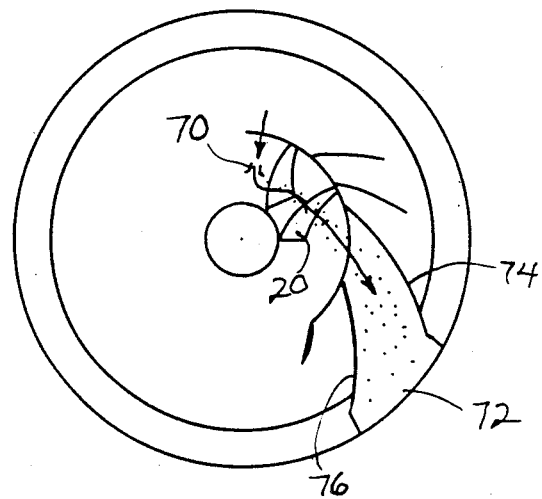
FIG. 2 is a fragmentary view amounting to a consolidation of various sections along the rotational axis of the gas turbine engine.
Figure 3:
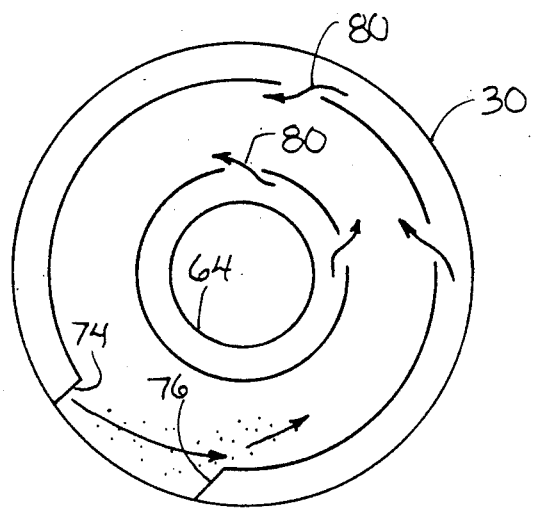
FIG. 3 is a sectional view taken approximately along the line 3—3 in FIG. 1.

The resulting mixture of air and fuel will remain at least semi-discreet, assuming that the speed of the shaft 14 is at least 20% of the rated speed of the machine. The angular position of the stream will be shifting continually as it flows first through the compressor 18 and then through the diffuser 28 to enter the plenum 30 and full axially as well as circumferentially to a radial fuel inlet area 72 in fluid communication with the interior of the combustor 58. To assist in channeling the air fuel mixture, spaced walls 74 and 76 may extend in a generally radial direction between the combustor 58 and the housing wall 30. As can be seen in FIGS. 1 and 2, these walls 74 and 76 have a somewhat spiral configuration and are more intended to confine the air fuel mixture which tends to flow discretely with some circumferential flow as a result of operation of the compressor 18 in any event.

The remainder of the plenum will be filled with essentially only compressed air that is free from fuel and thus may be utilized for cooling and dilution air purposes. Cooling, of course, will be obtained simply by filling the mass along the exterior of the combustor 58 as is well known, whereas dilution air may be provided by means of suitable openings 80 in various walls of a combustor 58 in a known fashion.

The swirl or circumferential flow to the air fuel mixture that is natural provides for good distribution of the same about the combustor 58 so that as fuel is but a single one of the jets 70 may be utilized as mentioned previously. However, one or more additional jets at equally angularly spaced locations may be employed if desired.

From the foregoing, it will be appreciated that invention enables the use of a low cost jetter nozzle 70 as a replacement for high pressure injectors more conventionally found in gas turbine engines. Consequently, an extremely low cost gas turbine engine results.

I claim:

1. A gas turbine engine comprising:
   a rotary compressor rotatable about an axis and having an inlet and an outlet;
   an annular combustor;
   a turbine wheel mounted for rotation about an axis generally centrally of said combustor and coupled to said compressor to drive the same;
   a nozzle interposed between said combustor and said turbine wheel for directing gases of combustion from the combustor against said wheel;
   a plenum surrounding said combustor and connected to said outlet;
   a low pressure fuel jet at said compressor inlet and directed to spray fuel into said inlet at a location radially displaced from said compressor axis and extending substantially less than peripherally around said inlet; and
   directing means within said plenum and having an entrance at said outlet for receiving substantially only a fuel-air mixture from said compressor, the remainder of said plenum also being in fluid communication with said outlet to receive substantially only air therefrom.

2. The gas turbine of claim 1 wherein said directing means is spiralled in configuration.

3. The gas turbine engine of claim 2 wherein said directing means has an exit directed radially inwardly into said combustor oppositely of said nozzle.

4. A gas turbine engine comprising
   a rotor journalled for rotation about an axis;
   said rotor including a rotary compressor and a turbine wheel;
   a diffuser surrounding said compressor radially outwardly thereof;
   an annular nozzle surrounding said turbine wheel radially outward thereof;
   an annular combustor about said turbine wheel and having an annular outlet connected to said nozzle;
   a plenum extending from said diffuser and about said combustor;
   means extending between said plenum and said combustor to define at least one channel in the plenum that is isolated from the remainder of the plenum, said channel(s) opening into said combustor oppositely of said nozzle and each having an entrance adjacent said diffuser; and
   means just upstream of said rotary compressor for injecting at least one low pressure jet of fuel into said compressor at a predetermined angular location such that at typical operating speeds of said engine, fuel from said jet mixed with compressed air, after leaving said diffuser will enter said entrance(s); with the remainder of, the air entering said plenum being operationally fuel free.

5. The gas turbine of claim 4 wherein said channel defining means comprises two spaced duct walls.

6. The gas turbine of claim 5 wherein said walls have a spiral configuration.

7. The gas turbine of claim 4 wherein said injecting means inject radially inward from a location adjacent the periphery of said rotary compressor.

* * * * *